(No Model.)
J. W. POTTER.
EXTENSION TABLE SLIDE.
No. 345,175. Patented July 6, 1886.
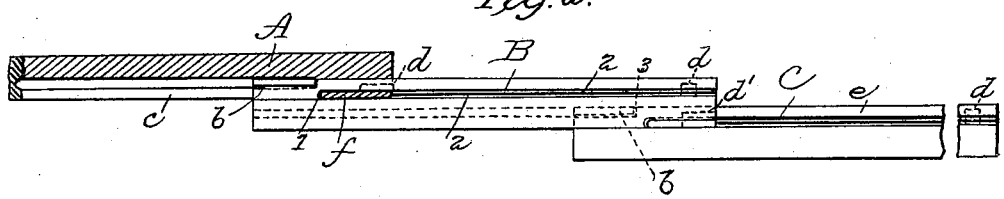
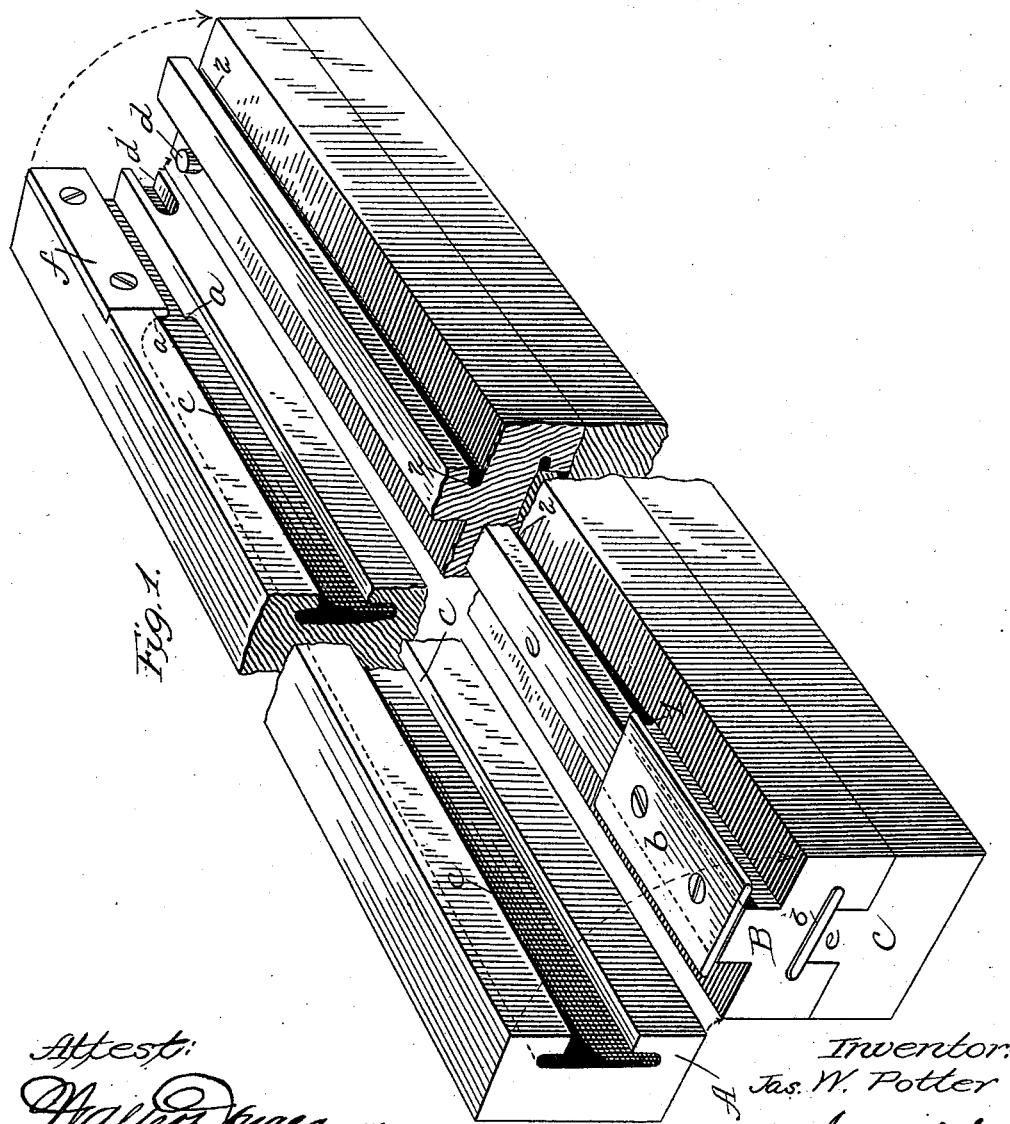
Attest:
Walter Donaldson
F. L. Middleton
Inventor:
Jas. W. Potter
by Joyce & Spear
Atty's.

United States Patent Office.

JAMES W. POTTER, OF POTTERVILLE, MICHIGAN.

EXTENSION-TABLE SLIDE.

SPECIFICATION forming part of Letters Patent No. 345,175, dated July 6, 1886.

Application filed March 6, 1886. Serial No. 194,293. (No model.)

*To all whom it may concern:*

Be it known that I, JAMES W. POTTER, of Potterville, in the county of Eaton and State of Michigan, have invented a new and useful Improvement in Extension-Table Slides; and I do hereby declare that the following is a full, clear, and exact description of the same.

My invention is an improved table-slide; and its object is provide a construction which will not be liable to fracture, and at the same time will be cheap to manufacture.

In the drawings I have represented simply the three slides of one side, not deeming it necessary to show the duplication of these parts or the table itself, as the invention is applied to the table in the usual manner. The table in other respects may be of any desirable make. In these drawings I have shown but three slides; but it will be obvious that more or less may be used, according to the length to which it is desired to extend the table.

In the accompanying drawings, Figure 1 represents in perspective three slides, the upper one being detached and turned back, so as to expose its under side to view. Fig. 2 shows two of the slides in side elevation and the other in longitudinal section.

The slides are represented at A B C. The slide A is formed with a channeled opening having a contracted mouth, c, down to the point a, and fitted to this is a metal plate, b, which is screwed or otherwise secured to projecting central rib on the slide B, the projecting rib e fitting accurately the contracted part of the opening in the slide A, and the metal plate fitting the channeled portion thereof, as plainly shown. The metal plate is of limited length, as shown in the drawings. The channeled portion of the slide A ceases at the point a; but the opening c continues to the end, and the metal plate b, coming in contact with the rear of the channeled portion at the point a, serves as a stop to prevent further movement of the slide in one direction. A dowel-pin, d, projecting at the opposite end of the slide B, serves as a stop for the slide A when moving in the opposite direction, the dowel-pin entering a recess, d', formed in the corresponding end of the slide A. The shape of the rib e, as shown in the end view, extends only to a point, 1, on the slide B, and from this point to the opposite end is formed with a groove upon one side, (marked 2,) as clearly shown in Fig. 1.

In the recess formed at one end in the lower face of the slide A is screwed or otherwise secured a plate, f, which is flush with the outer face of the slides and extends in engaging with the groove 2 in the rib e, thus serving to hold the parts in place, in connection with the groove and plate described in connection with the slide A. As the groove 2 only extends as far as the point 1, as indicated, the plate f will come in contact with the rear wall thereof, and thus serve as a stop. The slide B is formed in a like manner, with the channeled groove upon its under face having the contracted opening, and having its opposite end formed from the point 3 to the end with a plain groove, as described, in connection with the under side of the slide A, and the slide C is provided with a corresponding rib, e, and metal plate at one end and the grooved rib and metal plate on the under side of the slide B, as before described, and in case another slide is used the construction would be duplicated. A dowel-pin is also secured in the end of the slide C, and this enters a recess in the slide B, and serves to limit its movement in one direction.

I claim as my invention—

1. A slide for extension-tables, consisting of a slide, A, grooved centrally upon one side, the slide B, having a projecting rib adapted to enter the part of the groove in the slide A, a metal plate secured at one end, also adapted to enter the groove of the slide A and to be held by the walls thereof, in combination with a metal plate upon one side of the slide A, adapted to enter a groove in the projecting rib of the slide B, substantially as described.

2. In combination, slides having faces provided alternately with grooves and projecting ribs extending the length of the slide, means for holding said projecting ribs within the grooves of the slides, and a metal plate for each slide secured to the grooved side thereof at one end, adapted to enter grooves formed in the under side of the projecting rib, substantially as described.

3. A table-slide consisting of the part A, having the grooved face, the part B, having a projecting rib, with a metal plate secured at one end thereof and adapted to the groove in the slide A, a groove, 2, formed in one side of the projecting rib of the part B for a portion of its length, a plate secured to one side of the slide A and adapted to the groove $b$, the stops made by the change in the form of grooves in the parts A and B at the points $a$ and 1, and the dowel-pins adapted to limit the movement in the opposite direction, substantially as described.

In testimony whereof I have signed my name to this specification in the presence of two subscribing witnesses.

JAMES W. POTTER.

Witnesses:
WM. H. VAN AUKEN,
F. M. TAGGART.